(12) United States Patent
Prodélal

(10) Patent No.: US 12,280,637 B2
(45) Date of Patent: Apr. 22, 2025

(54) AIR VENT FOR A VEHICLE AND AIR VENT SYSTEM

(71) Applicant: ILLINOIS TOOL WORKS INC., Glenview, IL (US)

(72) Inventor: Marek Prodélal, Jicin (CZ)

(73) Assignee: Illinois Tool Works Inc., Glenview, IL (US)

( * ) Notice: Subject to any disclaimer, the term of this patent is extended or adjusted under 35 U.S.C. 154(b) by 617 days.

(21) Appl. No.: 17/573,035

(22) Filed: Jan. 11, 2022

(65) Prior Publication Data

US 2022/0219508 A1   Jul. 14, 2022

(30) Foreign Application Priority Data

Jan. 11, 2021   (DE) .................... 10 2021 100 289.3

(51) Int. Cl.
*B60H 1/34* (2006.01)
*B60H 1/00* (2006.01)

(52) U.S. Cl.
CPC ........... *B60H 1/3428* (2013.01); *B60H 1/345* (2013.01); *B60H 2001/00721* (2013.01)

(58) Field of Classification Search
CPC .... B60H 1/3414; B60H 1/3428; B60H 1/345; B60H 2001/00721
See application file for complete search history.

(56) References Cited

U.S. PATENT DOCUMENTS

| | | | | |
|---|---|---|---|---|
| 4,699,322 A | * | 10/1987 | Jobst ...................... | B60H 1/345 239/513 |
| 6,179,707 B1 | * | 1/2001 | Arold ................... | B60H 1/3421 454/150 |
| 11,007,844 B1 | * | 5/2021 | Habte .................. | B60H 1/3414 |
| 2022/0032737 A1 | | 2/2022 | Demerath | |

FOREIGN PATENT DOCUMENTS

| | | | | |
|---|---|---|---|---|
| DE | 202015102026 U1 | 6/2015 | | |
| DE | 202013012285 U1 | 1/2016 | | |
| DE | 102017111011 A1 | 7/2017 | | |
| DE | 102018122999 A1 | * | 3/2020 | ........... B60H 1/3421 |
| DE | 102019206739 A1 | 11/2020 | | |
| EP | 0707992 A1 | * | 4/1996 | |
| EP | 3702185 A1 | 9/2020 | | |

* cited by examiner

*Primary Examiner* — Edelmira Bosques
*Assistant Examiner* — Michael James Giordano
(74) *Attorney, Agent, or Firm* — THOMPSON HINE LLP

(57) ABSTRACT

An air vent for a vehicle includes a housing having an air inlet region and an opposite air outlet region, an air stream splitter received at least regionally in the housing in such a way that, at least in the air outlet region of the housing, an air duct that is delimited or defined by the housing is split into a first air duct and a second air duct separated therefrom. For air deflection as needed in a vertical direction, the air vent has at least two air guiding elements, which are received in the first air duct and are opposite to one another and are pivotable about a common first axis of rotation, and including at least two air guiding elements, which are received in the second air duct and are at least regionally opposite to one another and are pivotable about a common second axis of rotation.

13 Claims, 8 Drawing Sheets

AIR VENT FOR A VEHICLE AND AIR VENT SYSTEM

TECHNICAL FIELD

The present invention relates to an air vent, in particular for a ventilation system of a vehicle.

Furthermore, the invention relates to a ventilation system having such an air vent as well as a corresponding air vent system.

BACKGROUND

Air vents or air vent nozzles typically used in ventilation devices for vehicles enable the exiting air stream to be controlled in a targeted manner. Such air vents are used in order to supply fresh air, in particular, into a vehicle interior.

The air stream flows through an inlet opening at the air inlet region of the air vent into the air duct which is delimited by the housing wall of the air vent, through said air duct, and ultimately through an outlet opening at the air outlet region of the air vent into the interior of a vehicle (for example, a car or truck). The air stream generally follows a main flow direction, which can run in particular at least substantially parallel to a longitudinal axis of the housing of the air vent.

The air stream is deflected from the main flow direction in known air vents by one or more air guiding elements, for example pivotable air guiding blades. In addition to the air guiding elements, the housing of the air vent that delimits the air duct can also serve to deflect the air from the main flow direction.

For example, air vents are known whose housing walls run arcuately towards one another at least at the air inlet region, wherein an air stream directed by an air guiding element in the direction of the arcuate housing wall follows the arc shape and thus undergoes a corresponding deflection.

Such air vents are known, for example, in DE 20 2015 102 026 U1 and DE 10 2017 111 011 A1.

In addition, reference is made to DE 20 2013 012 285 U1. In the air vent known from this prior art, two mutually opposite housing walls of the air vent housing are designed in an arcuate fashion. An air guiding element having a first air guiding surface and a second air guiding surface opposite the first air guiding surface is arranged in the air vent housing, wherein a first air duct is formed by the housing and the first air guiding surface, and a second air duct is formed by the housing and the second air guiding surface. The first air duct is configured in order to transport a first volumetric flow of air that can be passed into the housing through the air inlet opening to the air outlet opening, while the second air duct is configured in order to transport a second volumetric flow of air that can be passed into the housing through the air inlet opening to the air outlet opening.

In addition, in the air vent known from DE 20 2013 012 285 U1, a wing element is arranged in the housing, wherein the wing element is movably arranged in an air inlet section between the air inlet opening and the end of the air guiding element facing said opening. The movability of the wing element is configured such that the direction of the air exiting the air outlet opening is adjusted due to the position of the wing element.

However, due to the arcuate design of the housing wall, such air vents are quite complex to manufacture, in particular by way of a plastic injection molding method.

Furthermore, the air vent known from DE 20 2013 012 285 U1 has certain disadvantages, in particular with respect to the overall achievable throughput of the amount of air to be introduced into the interior of the vehicle.

In particular, the operation of the air vent known from DE 20 2013 012 285 U1 is based on the air deflection being achieved by varying the volumetric flows (first and second volumetric flow) through the two air ducts formed using the air guiding element. By adjusting or varying the ratio of the volumetric flows passing through the first and second air ducts of the known air vent, a desired air deflection of the air streaming out of the air outlet region of the air vent is substantially performed.

However, it has been shown that such a mechanism for causing air deflection reduces the performance of the air vent, i.e., the volumetric flow that can be emitted by the air vent per unit of time and/or the "quality" of the air stream that can be emitted by the air vent, in particular with regard to air stream fanning and direction. Above all, with the approach known from DE 20 2013 012 285 U1, for example, an evenly distributed volumetric flow at the air outlet region of the air vent cannot be achieved for different positions of the air vent.

Apart from these disadvantages, the air vent known from DE 20 2013 012 285 U1 has conceptual disadvantages, in particular, in terms of air deflection.

For example, even in the straight alignment of the air guiding elements, the known air vents often divert or deflect the air repeatedly within the housing of the air vent, which results in an increased flow resistance. The effect of the air guiding elements received in the housing of the air vent is thereby significantly impaired, in particular for horizontal air deflection.

In addition, due to the increased flow resistance upstream of the outlet opening of the air vent, the exiting air stream is widened, which is also generally not desired.

A further disadvantage of known air vents is that the air guiding elements arranged in the air duct, such as air guiding blades, limit the flow area that is available for the air. This is true in particular in the region of the end positions of the air guiding elements. Limitations of the available flow area of more than 50% can occur.

In addition, for design reasons, there is a partial desire to integrate the outlet openings of the air vents harmoniously into the overall I-board design as slit-like openings in such a way that the functional elements of the air vents, in particular the blades, are not directly discernible from the vehicle interior.

Because air vents are directly visible in the interior of the vehicle, they are also intended to have an optically appealing appearance. In particular, there is therefore a need to adapt the design and appearance of air vents to the interior atmosphere. To this end, air vents are known that have a relatively low height compared to their length. However, air deflection in such slitted vents is typically limited.

In order to achieve a defined air deflection, the air vents known from the prior art therefore generally have a height such that a certain number of air guiding blades can be arranged. The number of air guiding blades thus also defines the maximum deflection.

However, there are problems with air deflection accomplished via the air guiding blades, which extend across the width of the air vent. In such air vents, only a small width of the air guiding blades, usually a maximum of three air guiding blades, can often be arranged. The maximum air deflection is thus limited.

For construction-related reasons, air vents having an even lower height can only comprise an air guiding blade extending across the width of the air vent. However, there is then insufficient air deflection, in particular in the vertical direction, i.e., up and down.

SUMMARY

Based on the situation described above, the underlying problem of the present invention is to provide an air vent for a vehicle, with which air vent an optimized air deflection is ensured, wherein the overall performance of the air vent is improved despite a relatively simple construction. In particular, this is intended to be achievable with a slit or line vent.

The invention is based in particular on the problem of providing an air vent of the abovementioned type which allows as much design freedom as possible with a maximized flow area for air.

Accordingly, the present invention relates in particular to an air vent for a vehicle, wherein the air vent comprises a housing having an air inlet region and an opposite air outlet region.

In the housing of the air vent, an air stream splitter is accommodated at least regionally such that, at least in the air outlet region of the housing, an air duct delimited or defined by the housing is split into a first air duct and into a second air duct separated therefrom.

For air deflection as needed in a first direction, in particular in a vertical direction, the air vent preferably comprises at least two air guiding elements or air guiding shells which are received at least regionally in the first air duct and are at least regionally opposite to one another and are pivotable about a common first axis of rotation that is perpendicular to the first direction relative to the housing.

Furthermore, for air deflection as needed in the first direction, the air vent preferably comprises at least two air guiding elements or air guiding shells, which are received at least regionally in the second air duct and are at least regionally opposite to one another and are pivotable about a common second axis of rotation that is perpendicular to the first direction relative to the housing.

The respective air guiding elements received at least regionally in the first air duct and in the second air duct serve to deflect the air stream and are movably supported in the housing between a first end position and a second end position.

The air vent is used in a vehicle, such as a car or truck. The inlet opening of the housing is supplied with fresh air that passes through the housing to the outlet opening and into the vehicle interior via said outlet opening. Before the fresh air exits the outlet opening of the housing, it is split into a first air stream and a second air stream separated therefrom by the air stream splitter. Preferably, the air stream splitting is carried out such that the same or at least substantially the same amount of air passes through the first air duct and through the second air duct per unit of time.

In particular, it is provided in the air vent according to the invention that the preferably at least two air guiding elements received at least regionally in the first air duct are pivotable, jointly and preferably uniformly relative to one another, about the first axis of rotation relative to the housing. In the same way, it lends itself that the preferably at least two air guiding elements received at least regionally in the second air duct are pivotable, jointly and preferably uniformly relative to one another, about the second axis of rotation relative to the housing.

According to implementations of the air vent according to the invention, it is provided that the first axis of rotation of the preferably at least two air guiding elements received at least regionally in the first air duct runs at least parallel to the second axis of rotation of the preferably at least two air guiding elements received at least regionally in the second air duct.

Various embodiments are considered for the air guiding elements that are received in the first air duct and in the second air duct, respectively.

For example, it is conceivable that the preferably at least two air guiding elements received at least regionally in the first air duct respectively comprise a concavely curved surface facing in the direction of the first air duct.

Alternatively or additionally, it is conceivable that a respective surface of the preferably at least two air guiding elements received at least regionally in the first air duct, said surface facing in the direction of the first air duct, is adaptable.

Alternatively or additionally, the preferably at least two air guiding elements received at least regionally in the first air duct are respectively configured as curved, cylindrical shell-like air guiding elements.

The same is true in a transferred sense for the preferably at least two air guiding elements received at least regionally in the second air duct.

The invention is not limited to embodiments in which two corresponding air guiding elements are received in the first air duct or in the second air duct, respectively. Rather, it is conceivable that only one air guiding element or a plurality of air guiding elements are provided in the first air duct or in the second air duct, which are preferably arranged and/or configured in a mirror-symmetric manner with respect to the corresponding axis of rotation (first axis of rotation and/or second axis of rotation).

According to embodiments of the air vent according to the invention, it is provided that the preferably at least two air guiding elements received at least regionally in the first air duct are pivotably supported in the housing between a first end position and a second end position about the first axis of rotation in such a manner that, in the first end position of the preferably at least two air guiding elements received in the first air duct, an air stream is directed through the first air duct to an interior surface region of the housing located downstream of the preferably at least two air guiding elements received in the first air duct, and, in the second end position of the preferably at least two air guiding elements received in the first air duct, an air stream is directed through the first air duct to a region of the air stream splitter located downstream of the preferably at least two air guiding elements received in the first air duct.

The same is true in a transferred sense for the preferably at least two air guiding elements received at least regionally in the second air duct.

The air stream splitter of the air vent according to the invention is preferably a body extended in the longitudinal direction of the housing and in the first direction, which is in particular arranged fixedly relative to the housing.

According to further developments of the air vent according to the invention, said air vent comprises an air guiding blade configured in order to cause as needed an air deflection in a second direction of the air vent perpendicular to the first direction. The at least one air guiding blade is preferably pivotably supported about a third axis of rotation that extends perpendicularly to the first and second axis of rotation. In particular, it is provided that the at least one air guiding blade is received at least regionally in both the first air duct and the second air duct, preferably upstream of the respective air guiding elements received in the first and second air duct.

The at least one air guiding blade is pivotably supported relative to the air stream splitter about the third axis of rotation, and preferably on the air stream splitter, for air deflection as needed in the second direction of the air vent, for example in the horizontal direction of the air vent.

In this context, it lends itself that, for air deflection as needed in the second direction, the air vent comprises a plurality of air guiding blades, which are motion-coupled to one another via a coupling rod mechanism, wherein the air guiding blades are preferably arranged parallel to one another in each position, and wherein the air guiding blades are in particular supported pivotably between a first end position and a second end position relative to the housing and relative to the air stream splitter as well as the air guiding elements received at least regionally in the first air duct and in the second air duct.

In at least one of the two end positions of the air guiding blades, the air guiding blades can block the first air duct and the second air duct completely.

Preferably, the at least two air guiding elements received at least regionally in the first air duct and the preferably at least two air guiding elements received at least regionally in the second air duct are motion-coupled to one another in such a way that, upon pivoting of the preferably at least two air guiding elements received at least regionally in the first air duct about the first axis of rotation, the preferably at least two air guiding elements received at least regionally in the second air duct are pivoted along about the second axis of rotation.

According to preferred implementations of the air vent according to the invention, in the first air duct, a cylindrical and in particular circular-cylindrical body extending in the direction of the first axis of rotation is received, which body is pivotably supported about the first axis of rotation relative to the housing. For the formation of the preferably at least two air guiding elements, two passageways running in particular parallel to one another and extending perpendicularly to the longitudinal direction of the cylindrical body are formed in the cylindrical body.

As used herein, the term "cylindrical body" means a geometric body that has constant cross-sectional areas when viewed along its length. This includes, for example, circular cylinders with a circular cross-sectional area, but also elliptical cylinders with an elliptical cross-sectional area, or cylinders with a polygonal cross-sectional area.

Alternatively or additionally, it is provided that, in the second air duct, a cylindrical and in particular circular-cylindrical body extending in the direction of the second axis of rotation is received, which body is pivotably supported about the second axis of rotation relative to the housing. For the formation of the preferably at least two air guiding elements, two passageways running in particular parallel to one another and extending perpendicularly to the longitudinal direction of the cylindrical body are formed in the cylindrical body.

Of course, it is also conceivable to only form a single passageway in one or both cylindrical bodies.

The abovementioned embodiments, in which the air guiding elements are realized with the aid of at least one passageway introduced in a cylindrical body, constitute a particularly space-saving but effective solution for the formation of the air vent.

According to embodiments of the air vent according to the invention, at least in the region in which the air duct delimited or defined by the housing is split into the first and second duct and in which the at least two air guiding elements are received in the first and second air ducts, the housing is formed by at least substantially rectilinear wall regions. In other words, at least in this region, the housing wall is not designed in a curved fashion.

Alternatively or in addition to this aspect, it is provided that, at least in the air outlet region of the housing, the housing is formed by at least substantially rectilinear wall regions.

In particular, in a further development of the last mentioned embodiment, it is provided that the interior surface region of the housing comprises at least one bridge region, which protrudes perpendicularly or obliquely at least regionally from the interior surface region of the housing at the air outlet region of the housing and projects into an air outlet opening of the air vent.

In the air vent according to the invention, the air guiding elements in the first and second air ducts deflect the air streaming through the corresponding air duct against interior surface regions of the housing, as a result of which a positive pressure is generated therein, which is then required for the corresponding air deflection. This is particularly true when the respective air guiding elements are pivoted out of their neutral position.

For this purpose, it lends itself that the interior surface region of the housing comprises a corresponding bridge region, which at least regionally projects into an air outlet opening of the air vent at the air outlet region of the housing. Of course, however, other embodiments are also conceivable here, in particular of the air outlet region of the housing.

In particular, the bridge region projecting at least regionally into the air outlet opening of the air vent serves as a type of "spoiler" and in particular serves to positively influence the deflection angle of the air exiting the air vent, for example when a deflection of the air stream is effected with the aid of the air guiding elements.

In other words, the at least one bridge region actively supports a deflection of the air stream effected, for example, by the air guiding elements.

For this purpose, it is provided in particular that the bridge region(s) make the particularly slit-like air outlet opening(s) of the air vent correspondingly smaller.

At the same time, the at least one bridge region can serve as a visual blind, so that components of the air vent responsible for air stream deflection are not visible in a top plan view of the air outlet region of the air vent.

The invention further relates to a ventilation system for a vehicle, having an air vent of the aforementioned kind according to the invention.

BRIEF DESCRIPTION OF THE DRAWINGS

An exemplary embodiment of the air vent according to the invention is described in more detail in the following, with reference to the accompanying drawings.

The following are shown.

DETAILED DESCRIPTION

Figure 1:
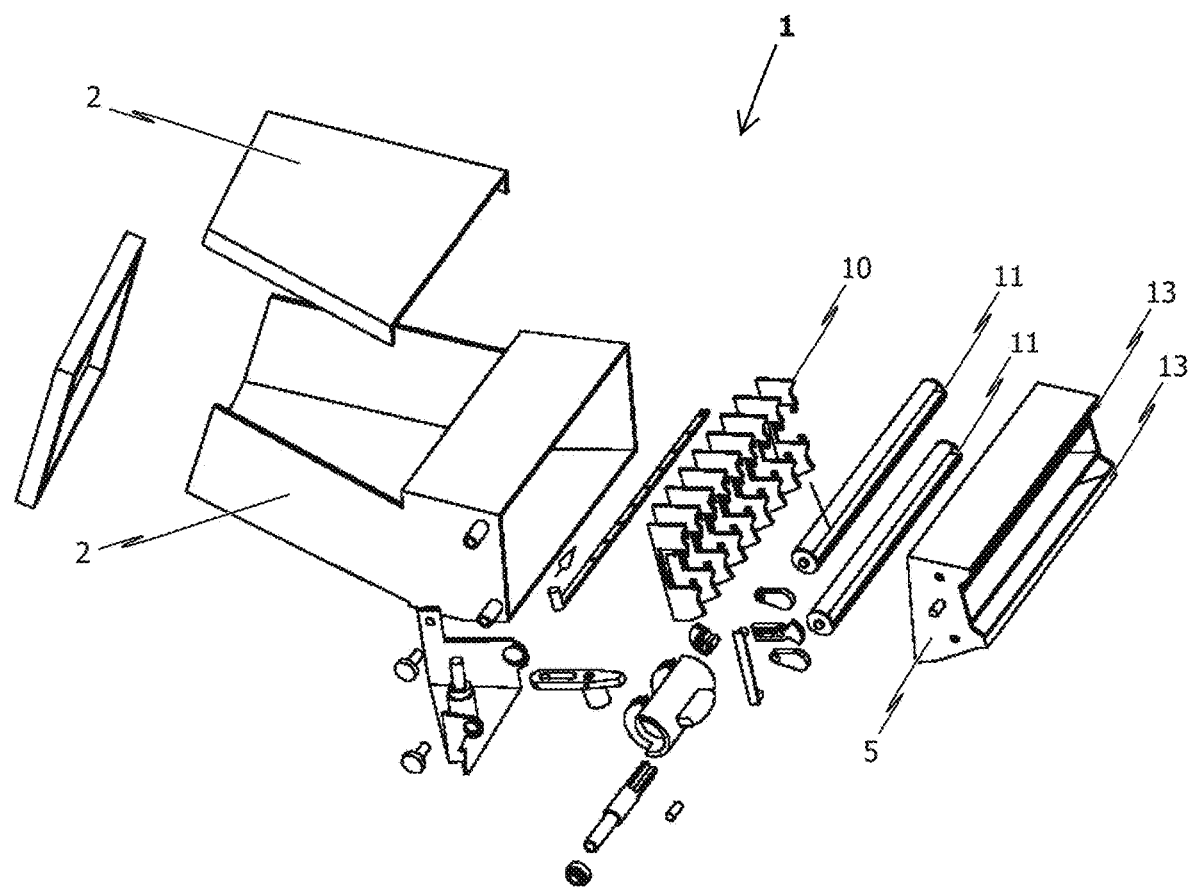
FIG. 1 schematically and in an isometric exploded view, an exemplary embodiment of the air vent according to the invention.
Figure 2:
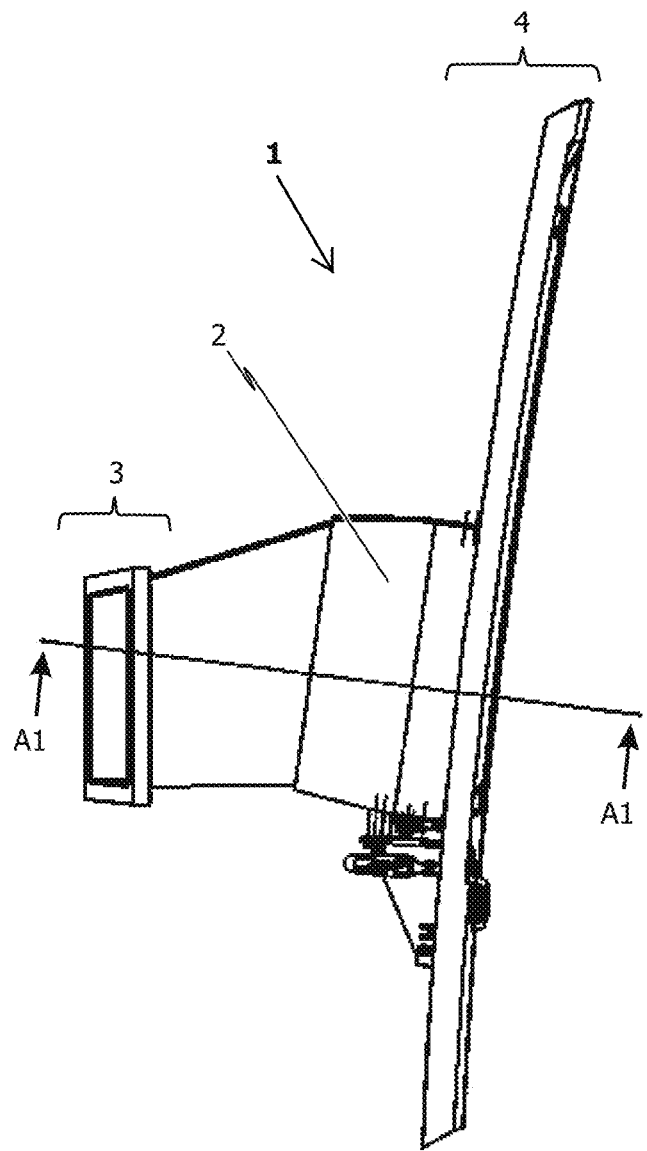
FIG. 2 schematically and in a top view, the exemplary embodiment of the air vent according to the invention according to FIG. 1 in an assembled state.
Figure 3A:
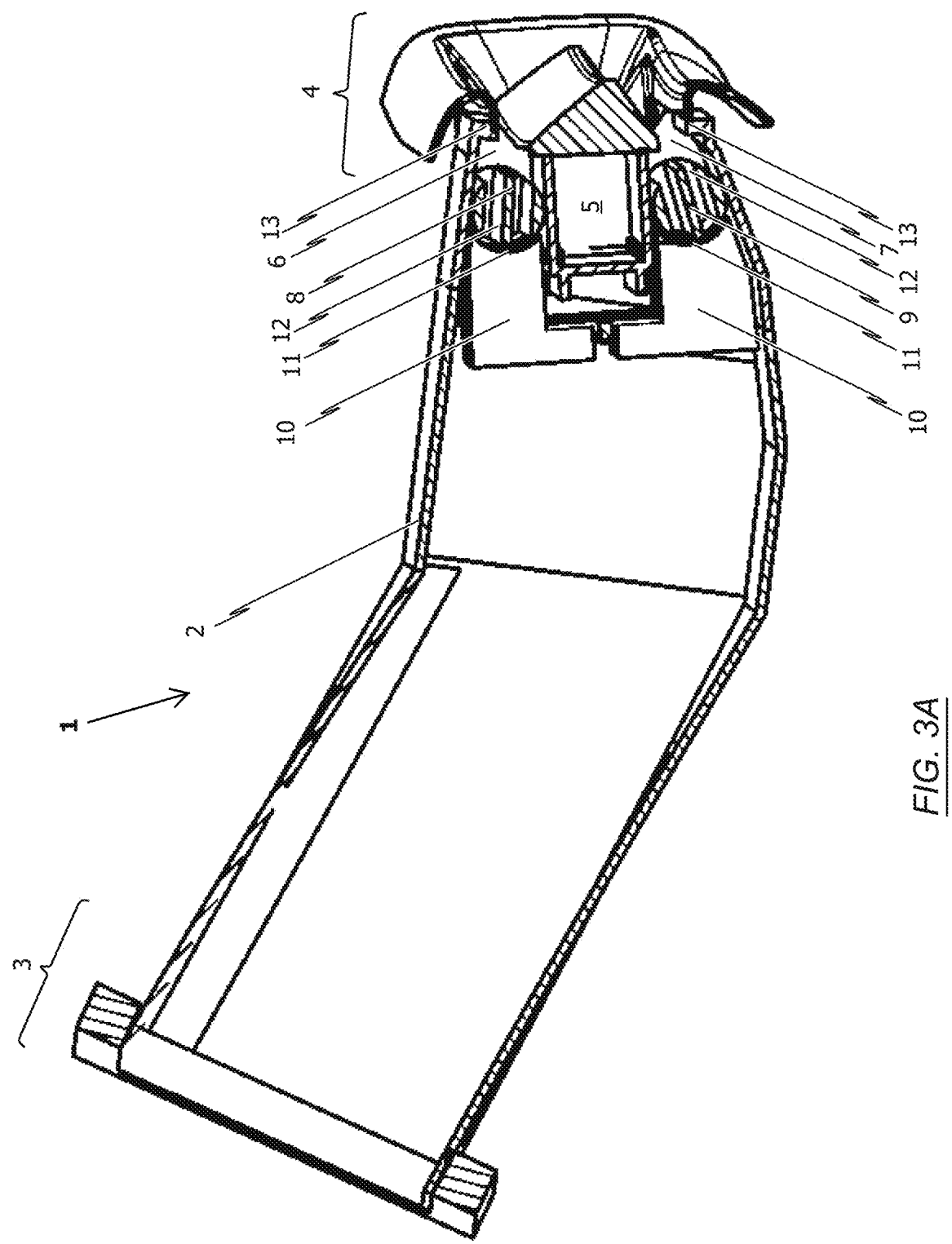
FIG. 3A schematically and in a sectional view along line A1-A1 in FIG. 2, the exemplary embodiment of the air vent according to the invention in a state in which air deflection from the air vent in the first/vertical direction does not occur.
Figure 3B:
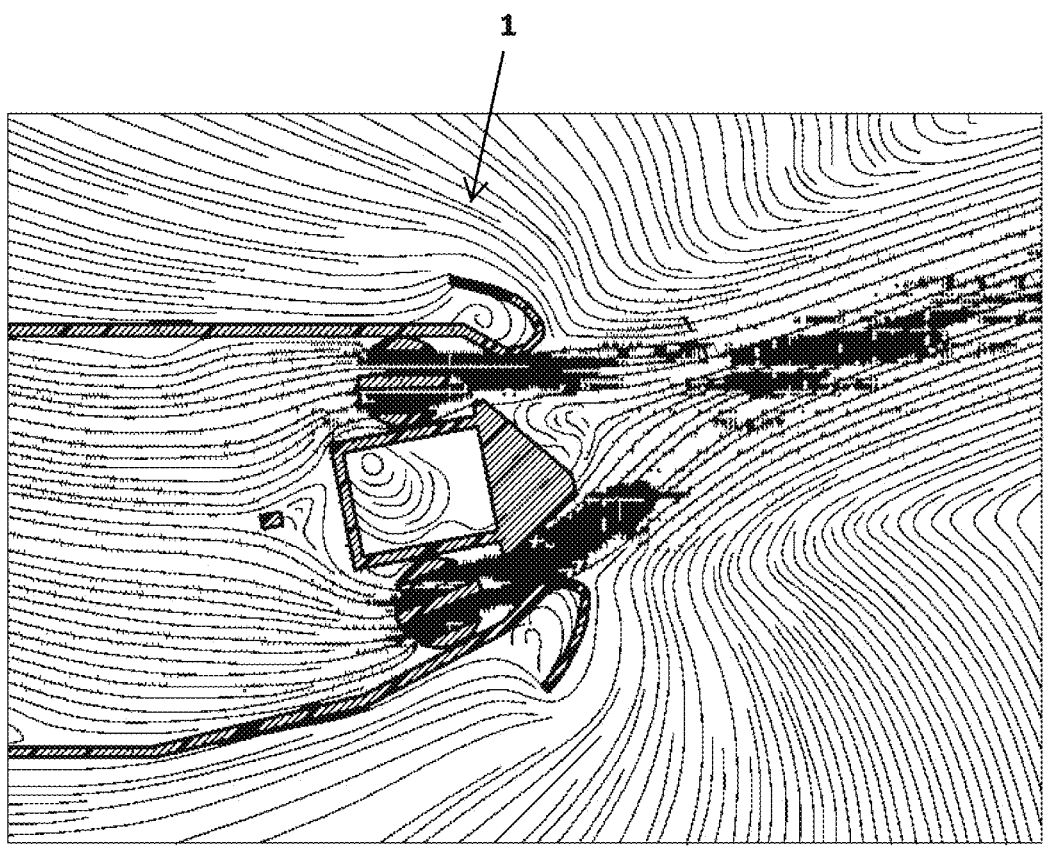
FIG. 3B schematically, the flow profile through the exemplary embodiment of the air vent according to the invention in its straight alignment according to FIG. 3A.
Figure 4A:
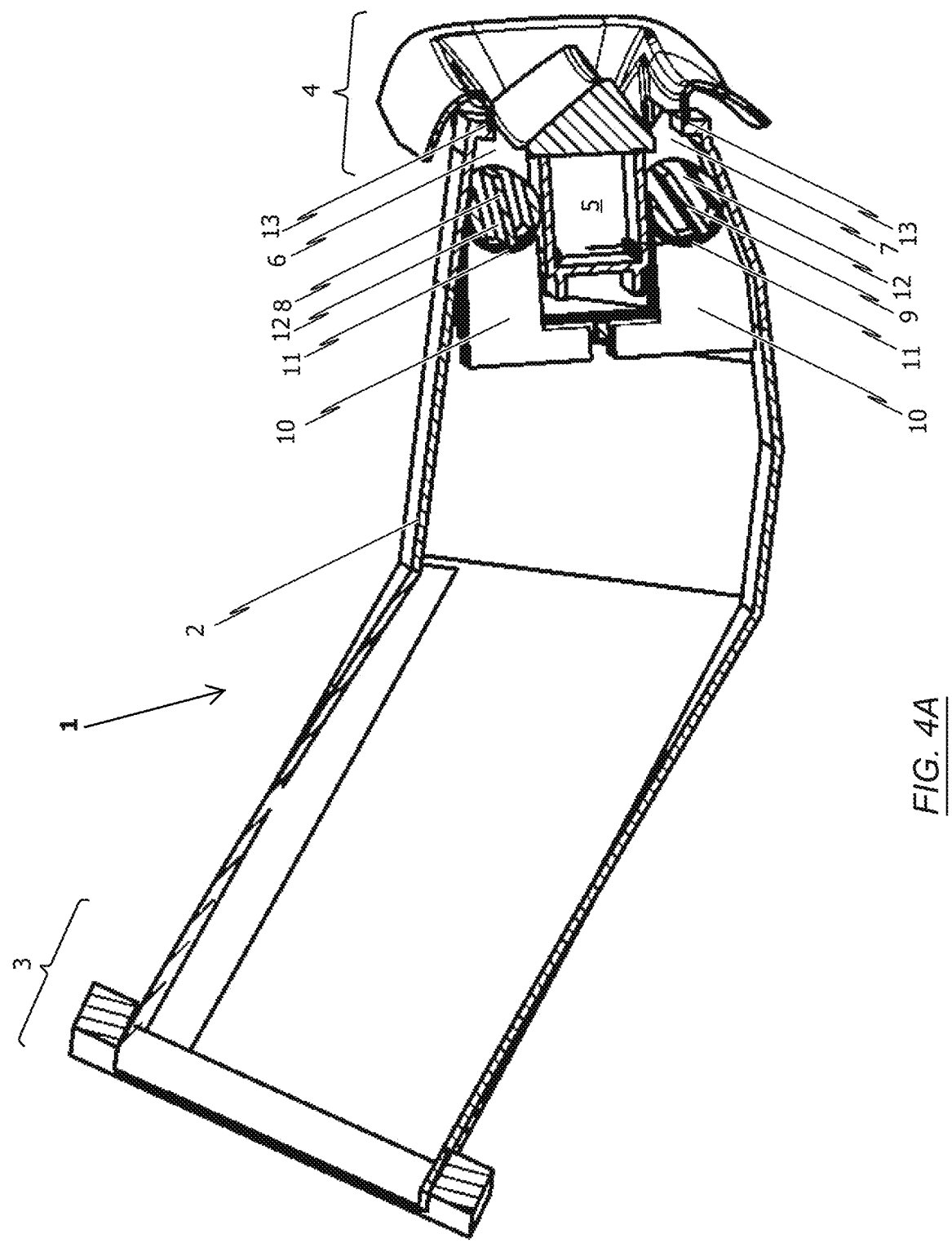
FIG. 4A schematically and in a sectional view along line A1-A1 according to FIG. 2, the exemplary embodiment of the air vent according to the invention, namely in a state in which air deflection from the air vent occurs vertically downwards.
Figure 4B:
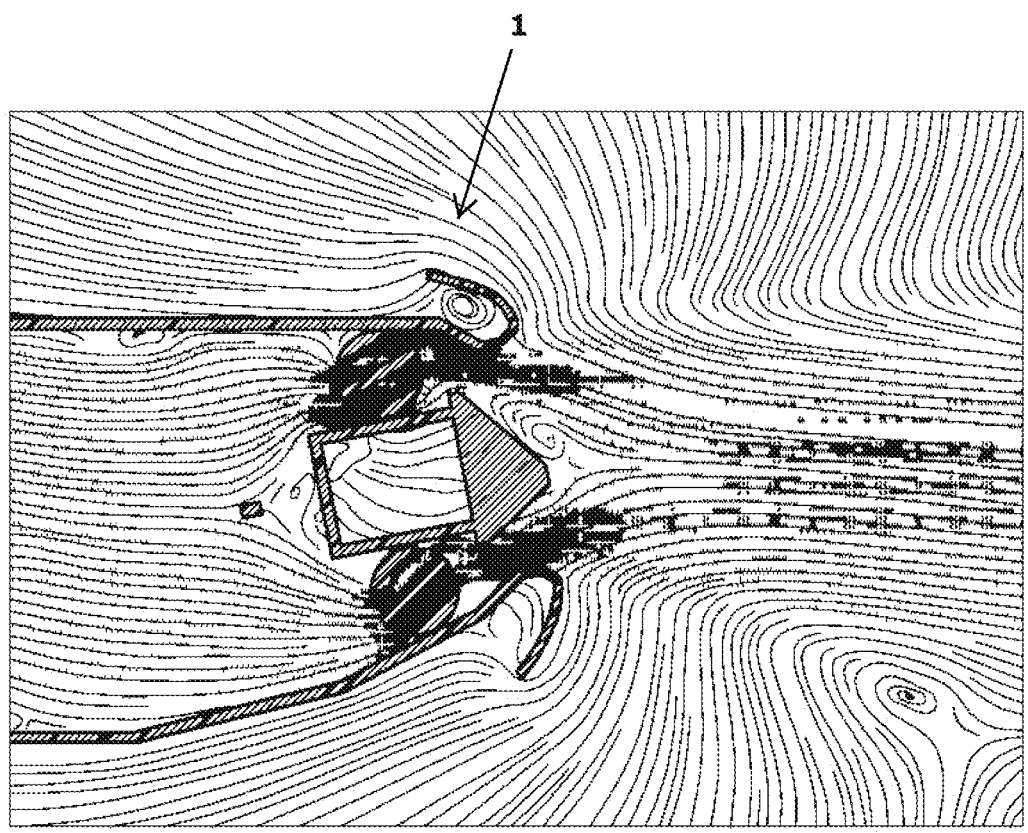
FIG. 4B schematically, the flow profile of the air flowing through the air vent according to FIG. 4A.
Figure 5A:
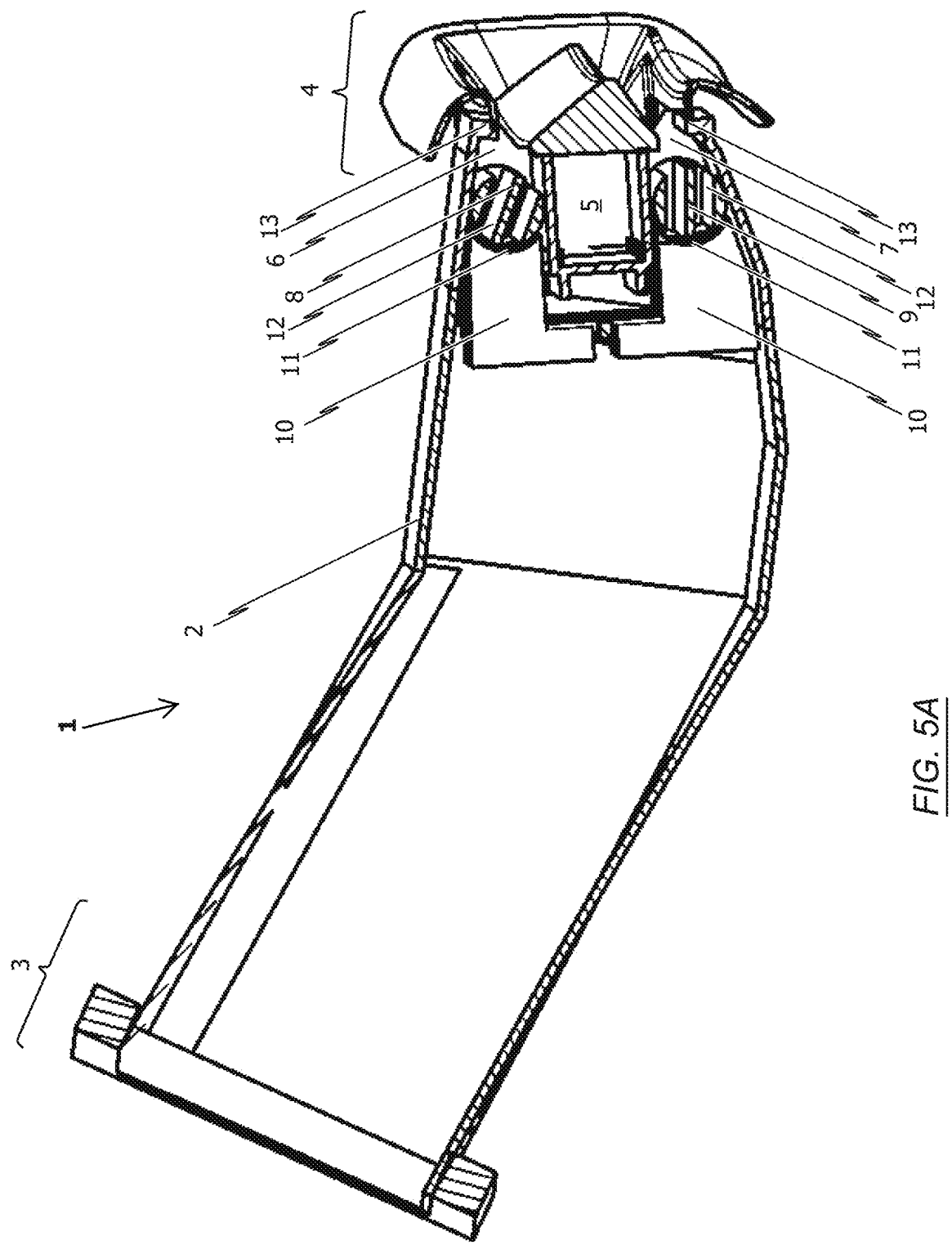
FIG. 5A schematically and in a sectional view along line A1-A1 according to FIG. 2, the exemplary embodiment of the air vent according to the invention, namely in a state in which air deflection from the air vent occurs vertically upwards.
Figure 5B:
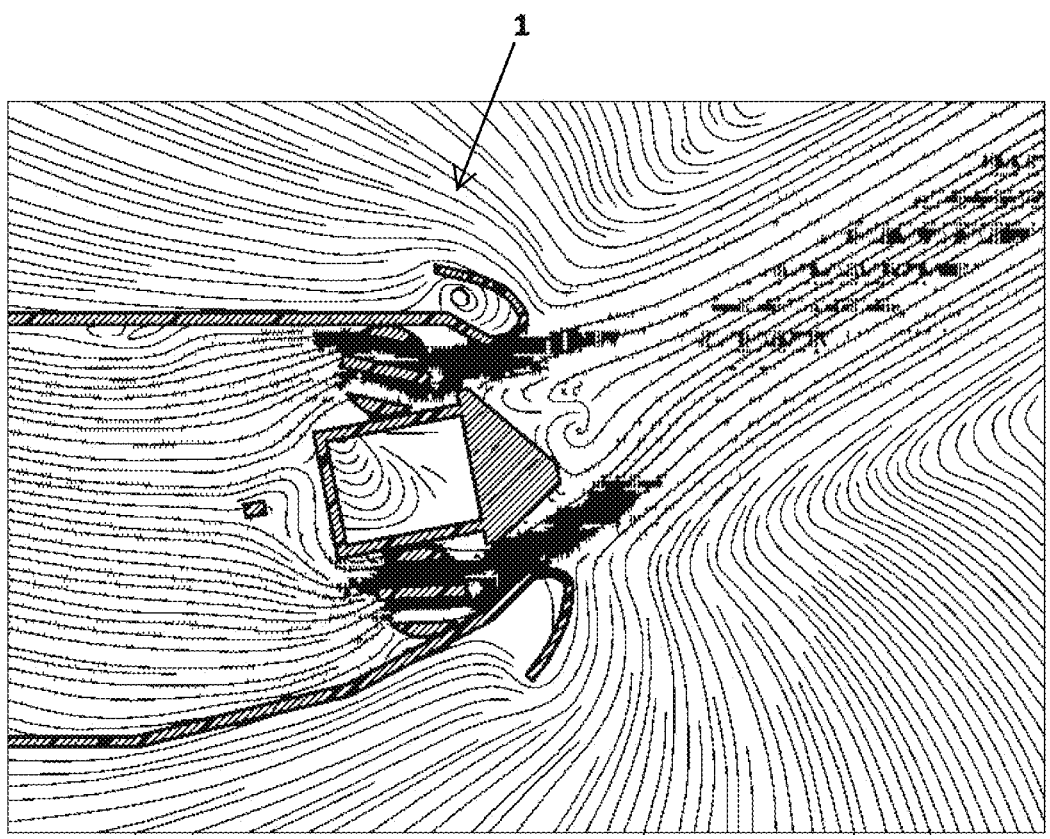
FIG. 5B schematically, the flow profile of the air flowing through the air vent according to FIG. 5A.

The air vent 1 according to the exemplary embodiment of the invention shown in the drawings comprises a housing 2 having an inlet opening at an air inlet region 3 and at least one outlet opening (here: two slit-like outlet openings) at an air outlet region 4, wherein the air outlet opening of the air vent 1 is delimited by a housing outlet wall.

An air duct for an air stream passing through the housing 2 along a main flow direction is defined between the inlet opening and the outlet opening. The air vent 1 is installed in a vehicle, such as a car or truck, and in particular directs fresh air into the interior of the vehicle.

In the housing 2, an air stream splitter 5 is accommodated such that, at least in the air outlet region 4 of the housing 2, the air duct delimited or defined by the housing 2 is split into a first air duct 6 (seen above in the drawings) and into a second air duct 7 (seen below in the drawings) separated therefrom by the air stream splitter 5.

In particular, it is provided that the air stream splitter 5 is a body extended in the vertical and horizontal direction of the air vent 1, which is fixedly arranged relative to the housing 2 of the air vent 1.

For air deflection as needed in a first direction, in particular in a vertical direction, the air vent 1 preferably comprises at least two air guiding elements 8 which are received at least regionally in the first (upper) air duct 6 and are at least regionally opposite to one another and are pivotable about a common first axis of rotation that is perpendicular to the first (vertical) direction relative to the housing 2. Furthermore, the air vent 1 preferably comprises at least two air guiding elements 9 which are received at least regionally in the second air duct 7 and are at least regionally opposite to one another and are pivotable about a common second axis of rotation that is perpendicular to the first direction relative to the housing 2.

In particular, it is provided in this context that the first axis of rotation of the preferably at least two air guiding elements 8 received at least regionally in the first (upper) air duct 6 runs at least at least substantially parallel to the second axis of rotation of the preferably at least two air guiding elements 9 received at least regionally in the second (lower) air duct 7.

As can be discerned from a combination of the views in FIG. 3A to FIG. 5B, it is provided in the exemplary embodiment of the air vent 1 according to the invention and shown in the drawings that the preferably at least two air guiding elements 8 received at least regionally in the first (upper) air duct 6 are pivotable, jointly and in particular uniformly relative to one another, about the second axis of rotation relative to the housing 2.

The same is true in a transferred sense for the preferably at least two air guiding elements 9 received at least regionally in the second (lower) air duct 7. In detail, the preferably at least two air guiding elements 9 received at least regionally in the second (lower) air duct 7 are pivotable, likewise jointly and in particular uniformly relative to one another, about the second axis of rotation relative to the housing 2.

Between the preferably at least two air guiding elements 8, 9 arranged at least regionally in the first air duct 6 or in the second air duct 7, the first and second air ducts 6, 7, run respectively, preferably completely.

The at least two air guiding elements 8, 9, which are arranged in the first air duct 6 or in the second air duct 7, can be identical in design and can be only arranged in a mirrored manner to one another, as is the case in the exemplary embodiment of the air vent 1 according to the invention and shown in the drawings.

In particular, the at least two air guiding elements 8, 9 of the first or second air duct 6, 7 can be moveable in the same way, again in particular only mirrored with respect to one another.

However, the air guiding elements 8, 9 can also be configured in a shell-like manner. For example, they can be cylinder shells. However, other curvature geometries are also conceivable, for example a tapered or parabolic curvature. The curvature geometry can in particular depend on the opening geometry of the air vent 1.

For example, tapered curvatures can be employed in the case of a tapered opening gap. Generally speaking, the air guiding elements 8, 9 can preferably have a continuously curved shape.

The longitudinal axes of the air guiding elements 6, 7 can in particular extend perpendicularly to the direction of flow of the air through the housing 2. For example, when mounted in a vehicle, this longitudinal axis can run in the horizontal direction.

As can be seen in the drawings of the exemplary embodiment of the air vent 1 according to the invention, the air guiding elements of the first air duct 6 and the second air duct 7 are configured, in particular, in order to realize a rectilinear flow path.

If the air guiding elements 8, 9 received in the first air duct 6 or in the second air duct 7 are moved in the housing 2 between their final positions, the flow channel that is formed by the latter for air streaming through the housing 2 changes. The air is thus deflected from its main flow direction in the first air duct 6 or the second air duct 7 in a desired manner.

For example, due to a movement of the air guiding elements 8, 9 received in the first air duct 6 or the second air duct 7 when mounted in a vehicle, the air stream can be deflected vertically upwards or downwards, as illustrated in FIGS. 4A-4B and FIGS. 5A-5B. The direction and angle of the air deflection is determined by the position/movement position and curvature of the respective air guiding elements 8, 9, in particular at the emission point, i.e., the region immediately in front of the outlet opening.

In the exemplary embodiment of the air vent 1 according to the invention shown schematically in the drawings, it is provided that the respective air guiding elements 8, 9 in the first and second air ducts 6, 7 are not arranged immediately at the air outlet region 4 of the air vent 1, but rather offset upstream thereof. The air guiding elements 6 received at least regionally in the first air duct 6 are pivotably supported in the housing 2 between a first end position and a second end position about the first axis of rotation in such a manner that, in the first end position of the two air guiding elements 6 received in the first air duct 6, an air stream is directed through the first air duct 6 to an interior surface region of the housing 2 located downstream of the two air guiding elements 8 received in the first air duct 6.

On the other hand, in the second end position of the two air guiding elements 8 received in the first air duct 6, an air stream is directed through the first air duct 6 to a region of the air stream splitter 5 located downstream of the two air guiding elements 8 received in the first air duct 6.

The same is true in a transferred sense for the air guiding elements 9 received at least regionally in the second air duct 7.

By directing the air stream in the respective end positions of the air guiding elements 8, 9 towards an interior surface region of the housing 2 or in the direction of a region of the air stream splitter 5, a corresponding pressure cushion is built up there, which in turn deflects the air stream and guides it through the air outlet opening at the air outlet region 4.

As can be seen from the drawings, the air vent 1 according to the invention as seen in the exemplary embodiment further comprises air guiding blades 10 that serve for air deflection as needed in a second direction perpendicular to the first direction, i.e., in particular in the horizontal direction. Each air guiding blade 10 is pivotably supported about a third axis of rotation that extends perpendicularly to the first and second axis of rotation.

In particular, it is provided in this context that the air guiding blades 10 are received at least regionally in both the first air duct 6 and the second air duct 7 upstream of the respective air guiding elements 8, 9 received in the first and second air duct 6, 7.

The air guiding blades 10 are preferably motion-coupled to one another via a coupling bar mechanism, wherein the air guiding blades 10 are in particular arranged parallel to one another at each position. It is conceivable in this context that the air guiding blades 10 are in particular pivotably supported between a first end position and a second end position relative to the housing 2 and relative to the air stream splitter 5, as well as relative to the air guiding elements received at least regionally in the first air duct 6 and in the second air duct 7. In at least one of the two end positions, the air guiding blades 10 can block the first air duct 6 and the second air duct 7, preferably completely.

A comparison of the views in FIG. 3A to FIG. 5B shows that the air guiding elements 8 received at least regionally in the first air duct 6 and the air guiding elements 9 received at least regionally in the second air duct 7 are motion-coupled to one another in such a way that, upon pivoting of the air guiding elements 8 received at least regionally in the first air duct 6 about the first axis of rotation, the air guiding elements 9 received at least regionally in the second air duct 7 are pivoted along about the second axis of rotation.

The air stream splitter 5 is in particular received at least regionally in the housing 2 of the air vent 1 such that the air outlet region 4 of the air vent 1 is preferably split into two uniformly sized slit openings. In particular, the air vent 1 is embodied as a slitted outlet whose air outlet region 4 comprises a longitudinal extension in the second direction, which is preferably at least three times and even more preferably at least four times as large as the longitudinal extension in the first direction.

As can be seen in particular in the exploded view according to FIG. 1, in the preferred implementation of the air vent 1 according to the invention, in the first air duct 6, a cylindrical and in particular circular-cylindrical body 11 extending in the direction of the first axis of rotation is received, which body is pivotably supported about the first axis of rotation relative to the housing 2. For the formation of the at least two air guiding elements 8, two passageways 12 running in particular parallel to one another and extending perpendicularly to the longitudinal direction of the preferably cylindrical body 11 are formed in the cylindrical body 11.

Additionally, it is provided that, in the second air duct 7, a preferably cylindrical and in particular circular-cylindrical body 11 extending in the direction of the second axis of rotation is received, which body is pivotably supported about the second axis of rotation relative to the housing 2. For the formation of the at least two air guiding elements 9, two passageways 12 running in particular parallel to one another and extending perpendicularly to the longitudinal direction of the cylindrical body 11 are formed in the cylindrical body 11.

It can further be seen in the drawings that, in the air vent 1 according to the invention, it is provided that, at least in the region in which the air duct delimited or defined by the housing 2 is split into the first and second duct 6, 7 and in which the at least two air guiding elements 8, 9 are received in the first and second air ducts 6, 7, the housing 2 is formed by at least substantially rectilinear wall regions. In other words, at least in this region, the housing wall is not designed in a curved fashion.

Additionally, it is provided that, at least in the air outlet region 4 of the housing 2, the housing 2 is formed by at least substantially rectilinear wall regions.

In particular, it can be discerned from the views in FIG. 3A to FIG. 5B that the interior surface region of the housing 2 comprises at least one bridge region 13, which protrudes perpendicularly or obliquely at least regionally from the interior surface region of the housing 2 at the air outlet region 4 of the housing 2 and projects into an air outlet opening of the air vent 1.

In the air vent 1 according to the invention, the air guiding elements 8, 9 in the first and second air ducts 6, 7 deflect the air streaming through the corresponding air duct 6, 7 against interior surface regions of the housing 2, as a result of which a positive pressure is generated therein, which is then required for the corresponding air deflection. This is particularly true when the respective air guiding elements 8, 9 are pivoted out of their neutral position.

For this purpose, it lends itself that the interior surface region of the housing 2 comprises the aforementioned bridge region 13, which at least regionally projects into an air outlet opening of the air vent 1 at the air outlet region 4 of the housing 2.

Of course, however, other embodiments are also conceivable here, in particular of the air outlet region of the housing 2.

In particular, the bridge region 13 projecting at least regionally into the air outlet opening of the air vent 1 serves as a type of "spoiler" and in particular serves to positively influence the deflection angle of the air exiting the air vent 1, for example when a deflection of the air stream is effected with the aid of the air guiding elements 8, 9.

In other words, the at least one bridge region 13 actively supports a deflection of the air stream effected, for example, by the air guiding elements 8, 9.

At the same time, the at least one bridge region 13 can serve as a visual blind, so that components of the air vent 1 responsible for air stream deflection are not visible in a top plan view of the air outlet region 4 of the air vent 1.

Although not shown in the drawings, it is generally conceivable that a preferably electromotively or manually actuatable drive is associated with the air vent 1 for adjusting as needed the air guiding elements 8, 9 received at least regionally in the first air duct 6 and/or in the second air duct 7 and/or the air guiding blades 10.

To this end, it is conceivable that the drive comprises a first drive shaft associated with the air guiding elements arranged at least regionally in the first air duct 6 and/or in the second air duct 7 and a second drive shaft associated with the at least one air guiding blade 10, wherein the first and second drive shaft of the drive are driveable independently of one another.

The invention is not limited to the exemplary embodiment shown in the drawings, but rather results when all of the features disclosed herein are considered together.

LIST OF REFERENCE NUMERALS

1 Air vent
2 Housing
3 Air inlet region
4 Air outlet region
5 Air stream splitter
6 First air duct
7 Second air duct
8 First air guiding elements
9 Second air guiding elements
10 Air guiding blade
11 Cylindrical body
12 Passageway in the cylindrical body
13 Bridge region

What is claimed is:

1. An air vent for a vehicle, wherein the air vent comprises a housing having an air inlet region and an opposite air outlet region, wherein the air vent comprises an air stream splitter that is received at least regionally in the housing in such a way that, at least in the air outlet region of the housing, an air duct that is delimited or defined by the housing is split into a first air duct and a second air duct separated therefrom, wherein, for air deflection as needed in a first direction, the air vent comprises at least two air guiding elements, which are received at least regionally in the first air duct and are at least regionally opposite to one another and are pivotable about a common first axis of rotation that is perpendicular to the first direction relative to the housing, and comprises at least two air guiding elements, which are received at least regionally in the second air duct and are at least regionally opposite to one another and are pivotable about a common second axis of rotation that is perpendicular to the first direction relative to the housing;
wherein a first curved cylindrical body is located in the first air duct and extends along the first axis of rotation, wherein the first curved cylindrical body is pivotably supported about the first axis of rotation relative to the housing, wherein, for formation of the at least two air guiding elements of the first air duct, in the first curved cylindrical body, two passageways running parallel to one another and extending perpendicularly to a longitudinal direction of the first curved cylindrical body are provided; and
wherein for air deflection as needed in a second direction perpendicular to the first direction, the air vent comprises at least one air guiding blade located upstream of the first curved cylindrical body, wherein the at least one air guiding blade includes a first downstream edge portion that is positioned adjacent to, and curved to match, an outer curved surface of the first curved cylindrical body, wherein the at least one air guiding blade is pivotably supported about a third axis of rotation that extends perpendicularly to the first axis of rotation and the second axis of rotation.

2. The air vent according to claim 1,
wherein the at least two air guiding elements received at least regionally in the first air duct are pivotable, jointly and uniformly relative to one another, about the first axis of rotation relative to the housing; and/or
wherein the at least two air guiding elements received at least regionally in the second air duct are pivotable, jointly and uniformly relative to one another, about the second axis of rotation relative to the housing.

3. The air vent according to claim 1,
wherein the first axis of rotation of the at least two air guiding elements received at least regionally in the first air duct runs at least substantially parallel to the second axis of rotation of the at least two air guiding elements received at least regionally in the second air duct.

4. The air vent according to claim 1,
wherein the at least two air guiding elements received at least regionally in the first air duct are pivotably supported in the housing between a first end position and a second end position about the first axis of rotation in such a manner that, in the first end position of the at least two air guiding elements received in the first air duct, an air stream is directed through the first air duct to an interior surface region of the housing located downstream of the at least two air guiding elements received in the first air duct, and, in the second end position of the at least two air guiding elements received in the first air duct, an air stream is directed through the first air duct to a region of the air stream splitter located downstream of the at least two air guiding elements received in the first air duct; and/or
wherein the at least two air guiding elements received at least regionally in the second air duct are pivotably supported in the housing between a first end position and a second end position about the second axis of rotation in such a manner that, in the first end position of the at least two air guiding elements received at least regionally in the second air duct, an air stream is directed through the second air duct to an interior surface region of the housing located downstream of the at least two air guiding elements received at least regionally in the second air duct, and, in the second end position of the at least two air guiding elements received at least regionally in the second air duct, an air stream is directed through the second air duct to a region of the air stream splitter located downstream of the at least two air guiding elements received at least regionally in the second air duct.

5. The air vent according to claim 1,
wherein the air stream splitter is arranged fixedly relative to the housing.

6. The air vent according to claim 1,
wherein the at least one air guiding blade comprise a plurality of air guiding blades, which are motion-coupled to one another via a coupling rod mechanism, wherein the plurality of air guiding blades are arranged parallel to one another in each position, and wherein the plurality of air guiding blades are supported pivotably between a first end position and a second end position relative to the housing and relative to the air stream splitter, wherein, in at least one of the first or second end positions, the plurality of air guiding blades completely block the first air duct and the second air duct.

7. The air vent according to claim 1,
wherein the at least two air guiding elements received at least regionally in the first air duct and the at least two air guiding elements received at least regionally in the second air duct are motion-coupled to one another in such a way that, upon pivoting of the at least two air guiding elements received at least regionally in the first air duct about the first axis of rotation, the at least two air guiding elements received at least regionally in the second air duct are pivoted about the second axis of rotation.

8. The air vent according to claim 1,
wherein the air stream splitter is received at least regionally in the housing of the air vent in such a way that the air outlet region of the air vent is split into two uniformly sized slit openings, wherein the air vent is embodied as a slit vent whose air outlet region in the second direction comprises a longitudinal extension, which is at least three times as large as the longitudinal extension in the first direction.

9. The air vent according to claim 1,
wherein an electromotive drive is associated with the air vent for adjusting as needed the air guiding elements received at least regionally in the first air duct and/or in the second air duct and/or for adjusting as needed the at least one air guiding blade for air deflection as needed in a second direction perpendicular to the first direction, wherein the drive comprises a first drive shaft associated with the air guiding elements arranged at least regionally in the first air duct and/or in the second air duct and a second drive shaft associated with the at least one air guiding blade, wherein the first drive shaft and the second drive shaft of the drive are driveable independently of one another.

10. The air vent according to claim 1,
wherein a second curved cylindrical body is located in the second air duct and extends along the second axis of rotation, wherein the second curved cylindrical body is pivotably supported about the second axis of rotation relative to the housing, wherein, for formation of the at least two air guiding elements of the second air duct, in the second curved cylindrical body, two passageways running parallel to one another and extending perpendicularly to a longitudinal direction of the second curved cylindrical body are formed; and
wherein the at least one air guiding blade includes a second downstream edge portion that is positioned adjacent to, and curved to match, an outer curved surface of the second curved cylindrical body.

11. An air vent according to claim 10, wherein the at least one air guiding blade is pivotably supported relative to the air stream splitter about the third axis of rotation, in or on the first curved cylindrical body of the first air duct and/or the second curved cylindrical body of the second air duct.

12. The air vent according to claim 1,
wherein, at least in the region in which the air duct delimited or defined by the housing is split into the first and second air ducts and in which the at least two air guiding elements are received in the first and second air ducts, the housing is formed by at least substantially rectilinear wall regions; and/or
wherein, at least in the air outlet region, the housing is formed by at least substantially rectilinear wall regions.

13. The air vent according to claim 1,
wherein an interior surface region of the housing comprises at least one bridge region, which protrudes perpendicularly or obliquely at least regionally from the interior surface region of the housing at the air outlet region of the housing and projects into an air outlet opening of the air vent.

\* \* \* \* \*